US009075609B2

(12) United States Patent
Bircher et al.

(10) Patent No.: US 9,075,609 B2
(45) Date of Patent: Jul. 7, 2015

(54) POWER CONTROLLER, PROCESSOR AND METHOD OF POWER MANAGEMENT

(75) Inventors: William Lloyd Bircher, Austin, TX (US); Alexander J. Branover, Chestnut Hill, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 770 days.

(21) Appl. No.: 13/327,380

(22) Filed: Dec. 15, 2011

(65) Prior Publication Data

US 2013/0159739 A1 Jun. 20, 2013

(51) Int. Cl.
*G06F 1/00* (2006.01)
*G06F 1/32* (2006.01)

(52) U.S. Cl.
CPC .............. *G06F 1/3243* (2013.01); *G06F 1/329* (2013.01); *Y02B 60/1239* (2013.01); *Y02B 60/144* (2013.01)

(58) Field of Classification Search
CPC ... G06F 1/3243; G06F 1/329; Y02B 60/1239; Y02B 60/144
See application file for complete search history.

(56) References Cited

U.S. PATENT DOCUMENTS

| | | | | |
|---|---|---|---|---|
| 6,823,516 | B1 | 11/2004 | Cooper | |
| 7,451,333 | B2 | 11/2008 | Naveh et al. | |
| 7,853,817 | B2 | 12/2010 | Yarak | |
| 8,112,651 | B2 * | 2/2012 | Wang et al. | 713/323 |
| 8,635,469 | B2 * | 1/2014 | Wang et al. | 713/300 |
| 8,689,028 | B2 * | 4/2014 | Diefenbaugh et al. | 713/320 |
| 2010/0058078 | A1 | 3/2010 | Branover et al. | |
| 2010/0077243 | A1 * | 3/2010 | Wang et al. | 713/323 |
| 2011/0161627 | A1 * | 6/2011 | Song et al. | 712/30 |
| 2012/0131370 | A1 * | 5/2012 | Wang et al. | 713/323 |
| 2012/0166731 | A1 * | 6/2012 | Maciocco et al. | 711/130 |
| 2013/0007483 | A1 * | 1/2013 | Diefenbaugh et al. | 713/320 |

OTHER PUBLICATIONS

Hewlett-Packard Corporation, Intel Corporation, Microsoft Corporation, Phoenix Technologies Ltd., Toshiba Corporation; "Advanced Configuration and Power Interface Specification"; Apr. 5, 2010; pp. 1-64 (Chapters 1-3); Hewlett-Packard Corporation, Intel Corporation, Microsoft Corporation, Phoenix Technologies Ltd., and Toshiba Corporation.

* cited by examiner

*Primary Examiner* — M Elamin
(74) *Attorney, Agent, or Firm* — Polansky & Associates, P.L.L.C.; Paul J. Polansky

(57) ABSTRACT

A processor includes a plurality of exclusive resources, a shared resource, and a controller configured to manage power state transitions of each of the plurality of exclusive resources and the shared resource. The controller receives a request from a resource to transition from a first power state to a lower power state and, in response to receiving the request, the controller controls power state transitions of the resource according to a first power control threshold when the resource is one of the plurality of exclusive resources and according to a second power control threshold that is greater than the first power control threshold when the resource is the shared resource.

20 Claims, 4 Drawing Sheets

POWER CONTROLLER, PROCESSOR AND METHOD OF POWER MANAGEMENT

FIELD

This disclosure relates generally to power management, and more particularly to power management decision-making protocols for hardware power state determination and demotion.

BACKGROUND

In some Central Processing Unit ("CPU") system architectures, especially those used in battery-powered systems, hardware mechanisms control power-saving modes of the CPU. The Advanced Configuration and Power interface ("ACPI") Specification is an open standard for unified operating system-centric device configuration and power management. While the context of the present application is not limited to ACPI, it provides some definitions which are useful for understanding the power modes of industry standard CPU's.

The ACPI defines various CPU power states ("C-states") of increasing power savings (decreasing power consumption) and, usually, with corresponding increasing latency. These latencies, as known in the art, include the time required to enter and/or exit a level of a power saving mode. In general, mobile computing systems attempt to conserve power by placing the processor in a lower-power C-state when there are no instructions to be executed. The ACPI defines a mechanism for notifying Operating System ("OS") software of the C-state capabilities and latencies of a CPU thread, core, and package based on CPU identity mechanisms that are known in the art and, in the ACPI, the OS software manages the C-state capabilities of the processor.

Conventional processor designs prevent entry into a power managed state when the transition rate is high (for example, due to a high interrupt rate). Since the performance impact of entry into the power managed state cannot be known at runtime, designs are calibrated to avoid power management usage when the expected transition rate is less than the "typical" entry delay or when the residency in a specific low-power state is short (making entry into the low-power state inefficient). The low-power state is efficient only if its residency is sufficiently long so as the power savings associated with the low-power state is greater than the power consumed during the entry and exit transitions (to and from the low-power state). However, where transition delays are not uniform, the conventional approach is not effective, particularly multi-core processors that have shared resources, such as caches.

SUMMARY OF EMBODIMENTS

In an embodiment, a processor includes a plurality of exclusive resources, where each exclusive resource is accessible to a certain core. The processor further includes a shared resource that is accessible to more than one core of a plurality of cores, and a controller configured to manage power state transitions of each of the plurality of exclusive resources and the shared resource. The controller receives a request from a resource to transition from a first power state to a tower power state and, in response to receiving the request, the controller controls power state transitions of the resource according to a first power control threshold when the resource is one of the plurality of exclusive resources and according to a second power control threshold that is greater than the first power control threshold when the resource is the shared resource.

In another embodiment, a method includes determining a power management performance impact associated with the resource entering a power managed state in response to receiving the request. In response to determining the power management performance impact, the method further includes controlling the resource to transition from a first power state to a second power state according to a selected one of a first delay and a second delay in response to determining the power management performance impact.

In still another embodiment, a power controller includes a register to store information identifying at least one shared resource that is accessible by more than one core of a plurality of cores, and a controller coupled to the register. The controller is configured to receive a request to enter a power managed state from a resource, to access the register to determine a sharing state of the resource in response to receiving the request, and to control power state transitions of the resource, in response to determining to the sharing state, using one of a first delay for a shared resource and a second delay for a non-shared resource that is accessible to a certain core of the plurality of cores.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

To avoid excessive performance loss or high power consumption, embodiments of a processor are described below that includes a controller configured to implement a non-uniform delay for entry into a power managed state for each resource based on whether the resource is shared by more than one functional unit (such as a computation core) or non-shared (i.e., accessible to a certain functional unit). In particular, the controller has a lower delay idle threshold for non-shared resources before allowing a particular non-shared resource to enter a power managed state as compared to a higher delay idle threshold for shared resources. Further, the controller can utilize multiple power management delay entry thresholds to provide a non-uniform delay across multiple tiers within a hierarchy of shared resources. In a particular example, the controller can apply a lower idle threshold to a non-shared resource as compared to an idle threshold associated with a first tier shared resource that is shared by two cores of a multi-core processor. However, the controller can apply a higher idle threshold to a shared resource that is shared across all cores of the multi-core processor, where the higher idle threshold is greater than the idle threshold of the first tier shared resource. In an example, the idle threshold for a particular resource can be determined at least partially as a function of the number of other functional units that share the particular resource. An example of a system that includes a processor having a controller having a non-uniform delay for entry of a resource into a power managed state is described below with respect to FIG. 1.

Figure 1:
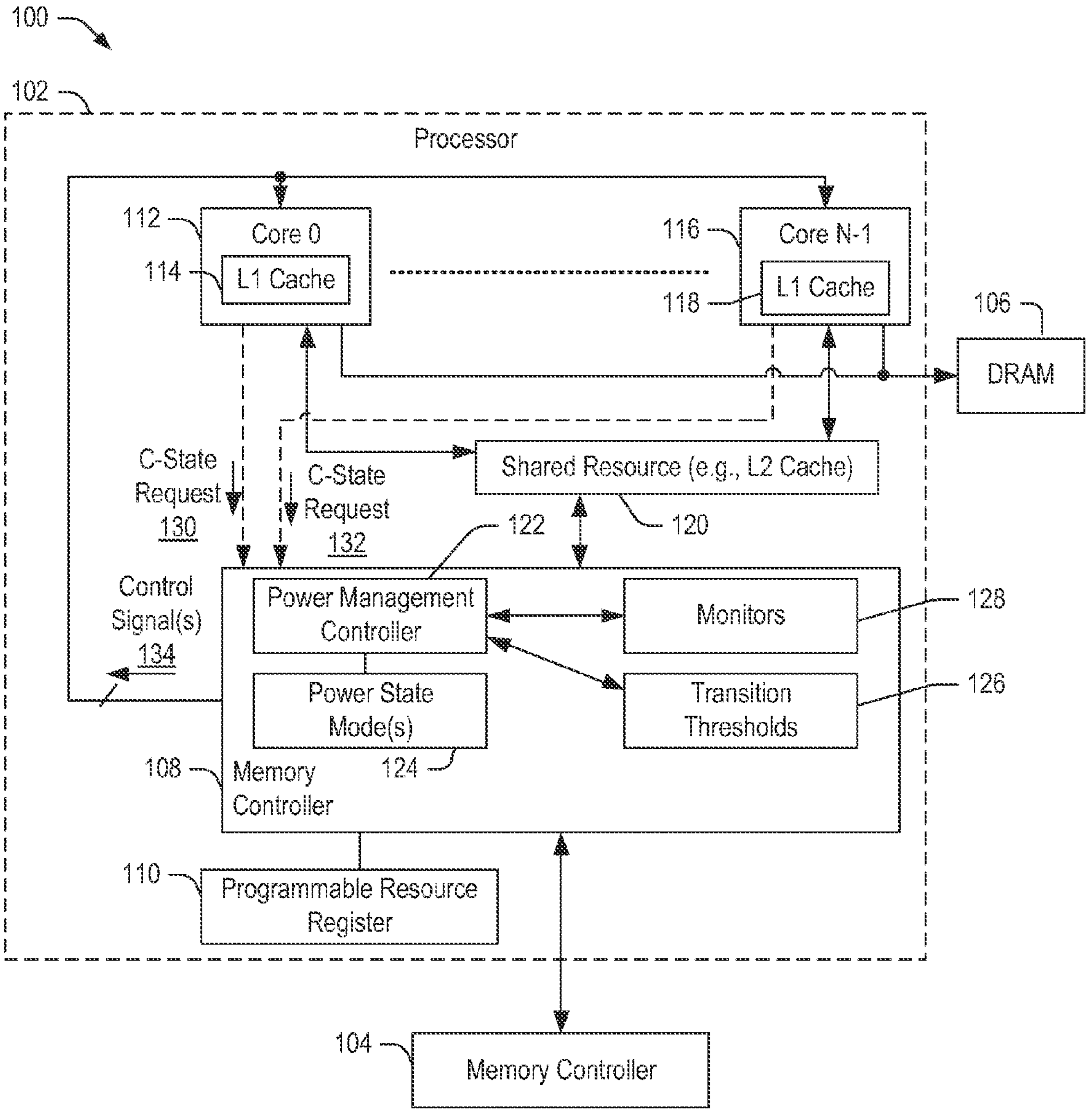
FIG. 1 is block diagram of an embodiment of a system including a processor having multiple execution cores and including a memory controller with a power management controller for managing power states of shared and non-shared resources.

FIG. 1 is block diagram of an embodiment of a system 100 including a processor 102 having multiple execution cores 112 and 116 and including a memory controller 108 with a power management controller 122 for managing power states of shared and non-shared resources. System 100 further includes a memory controller 104 coupled to an external memory controller 108, and a dynamic random-access memory (DRAM) 106 coupled to execution cores 112 and 116. In an example, memory controller 108 can be a northbridge that is communicatively coupled to a southbridge (memory controller 104).

Processor 102 includes multiple execution cores. Though only execution cores 112 and 116 are shown, processor 102 can include any number of execution cores. Each execution core 112 and 116 has an associated level one (L1) cache memory 114 and 118, respectively. L1 cache memory 114 is exclusive to execution core 112 and represents a non-shared (exclusive) resource in that is used by (and is only accessible to) execution core 112, but is not shared by (accessible to) other execution cores (such as execution core 116). Similarly, L1 cache memory 118 is exclusive to execution core 116 and represents a non-shared (exclusive) resource that is used by execution core 116, but is not shared by other execution cores (such as execution core 112). Processor 102 father includes a shared resource 120 (such as a level two (L2) cache) coupled to the memory controller 108 and to execution cores 112 and 116. Processor 102 also includes a programmable resource register 110 coupled to memory controller 108 and configured to store information indicating a state (shared or non-shared or non-shared) of each resource that can be power managed. In a particular example, programmable resource register 110 can include information indicating a sharing level associated with each resource (i.e., a non-shared resource, a first tier shared resource, a second tier shared resource, and so on), where each increasing sharing level indicates an increasing number of resources that share the particular resource.

Memory controller 108 includes a power management controller 122 configured to control power supplied to each of the execution cores 112 and 116. Further, memory controller 108 includes monitors 128, which are configured to monitor one or more parameters associated with the execution cores 112 and 116, such as power management transition rates, changes in power management transition delays, and the like. Memory controller 108 further includes power state mode(s) 124, which include instructions for managing the power modes of the processor 102 as a function of pre-configured or processor-controlled operating modes. Additionally, memory controller 108 includes transition thresholds 126, which define idle time delay transitions for different resources, based on whether the resource is shared.

Additionally, transition thresholds 126 can define different idle time delay transitions between different levels of shared resources. For example, an L1 cache that is accessible only to an execution core has a lower transition penalty than a shared L2 cache that is accessible to multiple execution cores. Further, an L3 cache that is shared by multiple processors may have a greater transition penalty than the shared L2 cache. In this example, the memory controller 108 may utilize multiple different thresholds from transition threshold 126 to control entry into a power managed state for each resource.

In an example, execution core 112 sends a c-state request 130 to memory controller 108 requesting entry into a power managed state. Power management controller 122 selectively provides a control signal 134 to alter the power state of execution core 112 based on an appropriate transition threshold 126. Similarly, execution core 116 can send a c-state request 132 to memory controller 108, which selectively provides control signal 134 to alter the power state of execution core 116. In response to the control signal 134, execution core 112 flushes L1 cache 114 to DRAM 106 and enters a power managed state. Similarly, in response to a separate control signal 134, execution core 116 flushes L1 cache 118 to DRAM 106 and enters a power managed state. Power management controller 122 allows execution cores 112 and 116 to enter the power managed states at different times and based on different delay thresholds. Further, upon receiving a request to enter a power managed state for L2 cache 120, power management controller 122 applies a higher threshold for determining when to flush the L2 cache 120.

In the illustrated example, system 100 includes N execution cores, including execution cores 112 and 116. A single resource (such as L2 cache 120) is shared across all of the execution cores. Initially, all of the execution cores are active and in a non-power managed state. The execution cores request power management entry sequentially from CPU core 112 to CPU core 116. In this example, the power management entry delay for the shared resource alone is known as a shared delay ($\text{Delay}_{Shared}$). The power management entry delay for each execution core is known as a non-shared delay ($\text{DelayCore}_{Non\text{-}Shared}$), which is a delay time of a non-shared core resource (such as a L1 cache 114 or 118). The power management entry delay for a last core (execution core 116) also includes the delay time of a shared core resource ($\text{DelayCore}_{Shared}$). The delay time of the last execution core 116 is longer since the shared resource (L2 cache 120) can only be power managed after the last execution core 116 has entered the power managed state. In this instance, the delay time for the last core resource is determined as follows:

$$\text{CoreDelay}_{Shared}=\text{CoreDelay}_{Non\text{-}Shared}+\text{Delay}_{Shared} \quad (1)$$

In this instance, the delay time for a shared core resource is much greater than the delay time of a non-shared resource:

$$\text{CoreDelay}_{Shared}>>\text{CoreDelay}_{Non\text{-}Shared} \quad (2)$$

Since the delay time for the shared core resource is much greater than the delay time for a non-shared resource, power management should be more strongly avoided when the last execution core 116 requests power management entry. Power management controller 122 takes advantage of this delay time relationship to select a power management action in response to the expected transition entry/exit delay.

In operation, each execution core 112 and 116 tracks a metric (X) that estimates the power management performance impact, such as idle duration or interrupt arrival rate. Power management controller 122 uses dynamically updated transition thresholds 126 to make decisions with respect to power management entry or denial. The metric (X) may be communicated to memory controller 108 in conjunction with the C-state requests 130 and 132. In an example, transition thresholds 126 include a first threshold ($\text{Threshold}_{Non\text{-}Shared}$) for non-shared resources that indicates when the estimated power management performance impact for entry of the particular resource into a power managed state is acceptable. Transition thresholds 126 also include a second threshold ($\text{Threshold}_{Shared}$) for shared resources that indicates when the estimated power management performance impact for entry of the particular resource into the power managed state is acceptable. In response to the C-state request, power management controller 122 selects the appropriate threshold based on which execution core 112 or 116 is making the C-state request and compares the performance impact metric (X) to the threshold to determine whether the particular resource should be allowed to enter the power managed state. In particular, power management controller 122 allows the particular resource to enter the power managed state when the performance impact metric (X) exceeds the selected threshold.

In the above example, the non-shared resources are depicted as L1 caches 114 and 118 within execution cores 112 and 116, respectively. However, such resources need not be execution cores, but could be memory cores or other exclusive (non-shared) resources. Similarly, the shared resource could be a shared core memory or other shared resource capable of entry into a lower-power state.

White the above-example uses the term exclusive (non-shared) resource and the term shared resource, the terms are used to describe the number of other functional units that have access to the particular resource. For example, L1 cache 114 within execution core 112 is accessible to execution core 112 and any components included therein. However, execution core 116 cannot directly access L1 cache 114, so L1 cache 114 is a non-shared resource. In contrast, shared resource 120 is accessible to execution cores 112 and 116, making it a shared resource.

While the above described example includes a power management controller 122 for applying different transition thresholds 126 to determine entry into a power managed state for different resources based on the sharing state of the particular resource (i.e., whether the resource is shared or not shared), it is also possible to determine such entry as a function of a count of the number of power managed resources. An example of such as system is described below with respect to FIG. 2.

Figure 2:
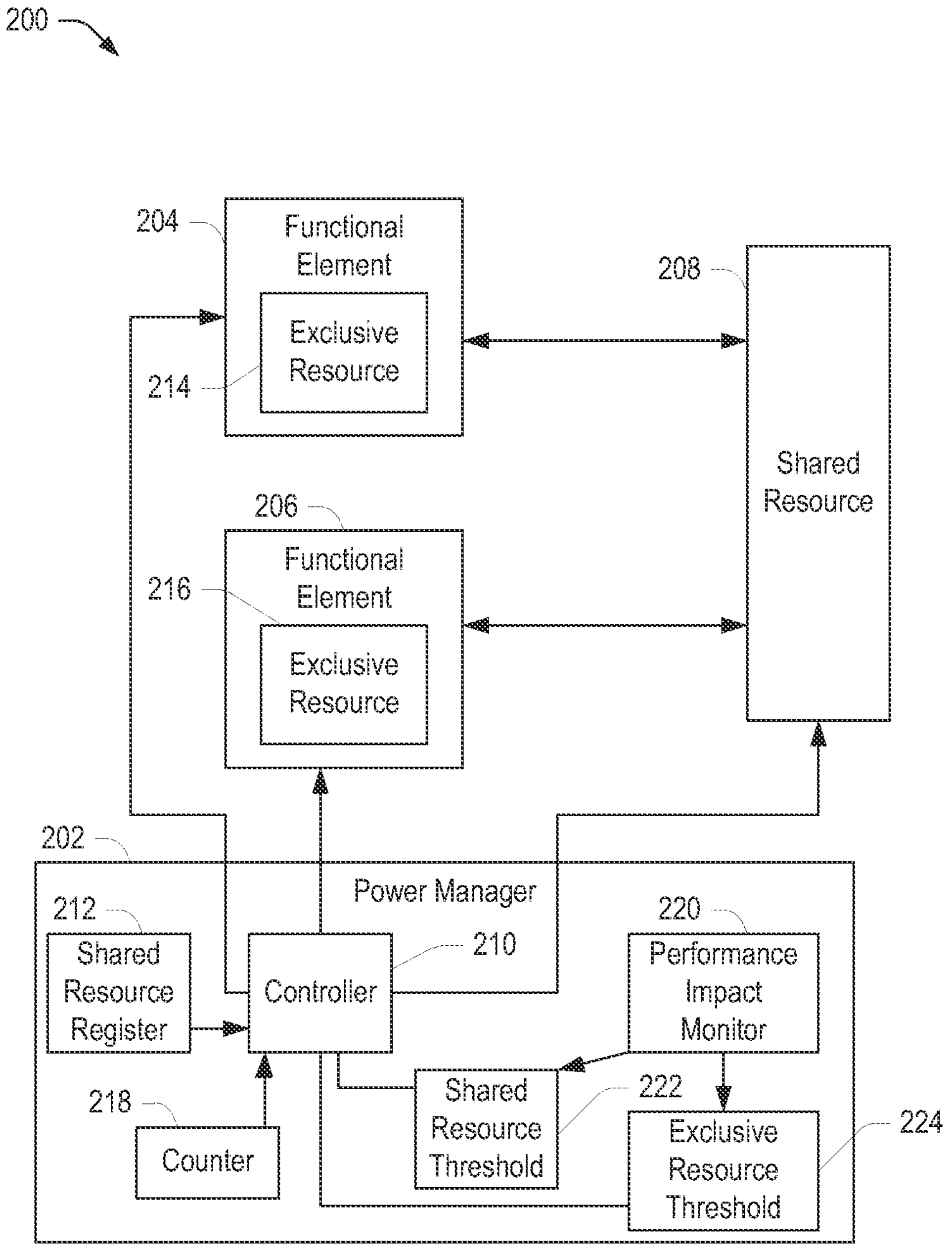
FIG. 2 is a block diagram of an embodiment of a system including multiple exclusive resources, a shared resource, and a power manager for managing their power states.

FIG. 2 is a block diagram of an embodiment of a system 200 including multiple exclusive resources 214 and 216, a shared resource 208, and a power manager 202 for managing their power states. System 200 includes a functional element 204 including exclusive resource 214. Functional element 204 is coupled to a shared resource 208 and to a controller 210 of power manager 202. System 200 further includes functional element 206 including exclusive resource 216. Functional element 206 is coupled to shared resource 208 and to controller 210.

Power manager 202 includes a controller 210 coupled to a shared resource register 212 configured to store information identifying which resources are shared and which are non-shared or exclusive. Controller 210 is coupled to functional elements 204 and 206 and to shared resource 208. Power manager 202 further includes a counter 218 to count a number of resources that are power managed, a shared resource threshold 222, an exclusive (non-shared) resource threshold 224, and a performance impact monitor 220. In this instance, a performance impact monitor may be maintained that monitors the idle cycles, power consumption, and power management transitions of the functional elements 204 and 206 and of the shared resource 208 and that updates the shared resource threshold 222 and exclusive resource threshold 224, respectively, based on the monitored data.

In an example, counter 218 counts a number of resources currently being power managed by power manager 202. Initially, each of the functional elements 204 and 206 and the shared resource 208 are active and not power managed. When a request is received from functional element 204 for entry into a power managed state, controller 210 determines the number of components currently being power managed from counter 218. If the value of counter 218 is less than the number of functional elements (i.e., count (c)<a number (N−1) of functional elements (from functional element 0 to functional element N−1), then controller 210 selects and uses exclusive resource threshold 224 to determine whether to allow entry of functional element 204 into a power managed state. If the count is not less than the number of functional elements, controller 210 selects the share resource threshold 222.

In an example, each functional element 204 and 206 monitors a performance impact metric (X) corresponding to the delay time associated with transitioning the functional element 204 or 206 to and from a power managed state. If the performance impact metric (X) of functional element 204 is less than the selected threshold, controller 210 allows functional element 204 to enter a power managed state by controlling a power level of functional element 204. Otherwise, controller 210 denies the request, denying entry of the functional element 204 into the power managed state.

In an alternative example, performance impact monitor 220 determines the performance impact metric (X) for each functional element 204 and 206. In this example, the performance impact monitor 220 may monitor a number of real time clock cycles and power consumption over time for particular elements. In an example, the performance impact monitor 220 monitors real time clock cycles and, after controller 210 allows entry of a resource into a power managed state, controller 210 alters a power state of the resource when the number of real time clock cycles exceeds the associated threshold. By applying different delay thresholds before altering the power state of the resource, controller 210 can improve the performance/power consumption ratio across workload classes, and especially for those types of processes with frequent intervals of partial activity (such as those compute cycles where only some of the compute (execution) units or cores are active), such as partial-thread workloads in a central processing unit (CPU) having multiple threads and partial compute-unit (CU) workloads in a general processing unit (GPU) having multiple CUs.

In still another example, controller 210 can determine a suitable threshold (shared resource threshold 222 or exclusive resource threshold 224) based on information from shared resource register. If controller 210 determines that the requesting resource is identified as a shared resource in shared resource register 212, controller 210 can select and apply the shared resource register 212 to determine whether the requesting resource should be denied entry into the requested power managed state.

Functional element 204 can be a memory device including a controller and a storage medium that is coupled to another shared memory device, such as a flash memory or cache. Alternatively, functional element 204 can be an execution unit with one or more internal memories and that is coupled to a shared resource, such as an L2 Cache or other shared resource.

In the above description, a controller operates to apply different transition thresholds for determining whether to allow entry of a resource into a power managed state. In the systems 100 and 200 of FIGS. 1 and 2, the controller can be configured to a selected one of a plurality of thresholds for determining whether and/or when to allow a particular resource to enter a power managed state. In an example, the decision logic implemented by the controller is configured to balance performance with power consumption by selectively applying the thresholds to maintain a desired performance level while conserving power. In a particular example, the controller may interface with user-configured settings within operating system software of a host system to determine a selected balance between performance and power consumption and selects a threshold based on the user-configured settings to strike the selected balance.

While the above discussion was directed to illustrative examples of systems configured to implement a non-uniform delay for entry into a power managed state depending on the resource requesting entry. However, other structural configurations can be used to implement the operations described above. One possible example of a method of managing power state entry is described below with respect to FIG. 3.

Figure 3:
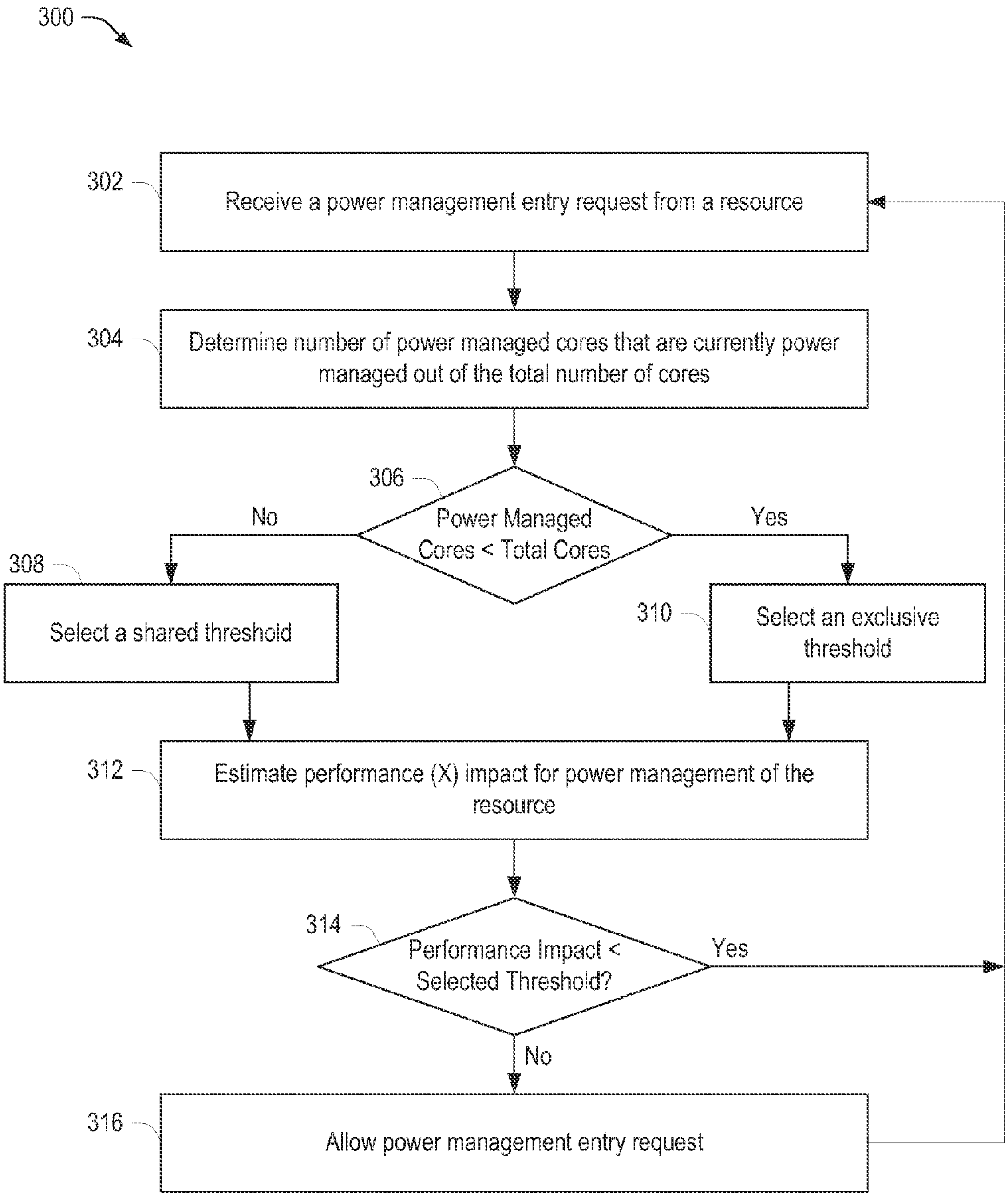
FIG. 3 is a flow diagram of an embodiment of a method of controlling entry of a resource into a power managed state as a function of a performance impact associated with power managing the particular resource.

FIG. 3 is a flow diagram of an embodiment of a method 300 of controlling entry of a resource into a power managed state as a function of a performance impact associated with power managing the particular resource. At 302, a controller receives a power management entry request from a resource. Advancing to 304, the controller determines a number of power managed cores that are currently power managed out of the total number of cores. Such power managed cores can be compute (or execution) cores, memory cores, or other functional elements of an integrated circuit. Controller may determine the number of power managed cores by retrieving a count value from a counter (such as counter 218 in FIG. 2). Continuing to 306, if the number of power managed cores is equal to the total number of cores, the method 300 advances to 308 and the controller selects a shared threshold. The shared threshold represents a core delay that is approximately equal to the sum of the delays for a shared resource and a non-shared resource to enter and exit a power managed state, since the last core to enter the power managed state is the initiator of the shared resource power management. At 306, if the number of power managed cores is less than the total number of cores, the method 300 proceeds to 310 and the controller selects an exclusive (non-shared) threshold.

Continuing to 312, the performance impact (X) is estimated for the power management of the resource. In one instance, the performance impact (X) is determined by a performance monitor of the resource itself. In another instance, the performance impact (X) is determined by a performance monitor of the controller. Moving to 314, if the performance impact is less than the selected threshold (shared or non-shared), the method 300 returns to 302 to receive another power management entry request from the resource. Otherwise, at 314, if the performance impact is equal to the selected threshold, the method 300 proceeds to 316 and the controller allows the power management entry request, allowing the requesting resource to be power managed.

In general, method 300 represents one possible example. However, in some instances, depicted blocks may be combined, re-ordered, or eliminated. For example, the estimation of the performance impact in block 312 can be performed by the resource prior to transmission of the power management entry request and may be provided to the controller as part of the power management entry request. Further, while method 300 is depicted as ending, it should be understood that the method 300 can be repeated iteratively for each compute core and then for each shared resource until exclusive and shared resources are power managed, placing the system into a low-power or idle state. Additionally, method 300 can extend to multiple tiers of shared resources, such that a last of a set of first tier shared resources has a higher transition threshold than the other shared resources of that first tier, and so on. Another example of a method of selectively applying a power management scheme is described below with respect to FIG. 4.

Figure 4:
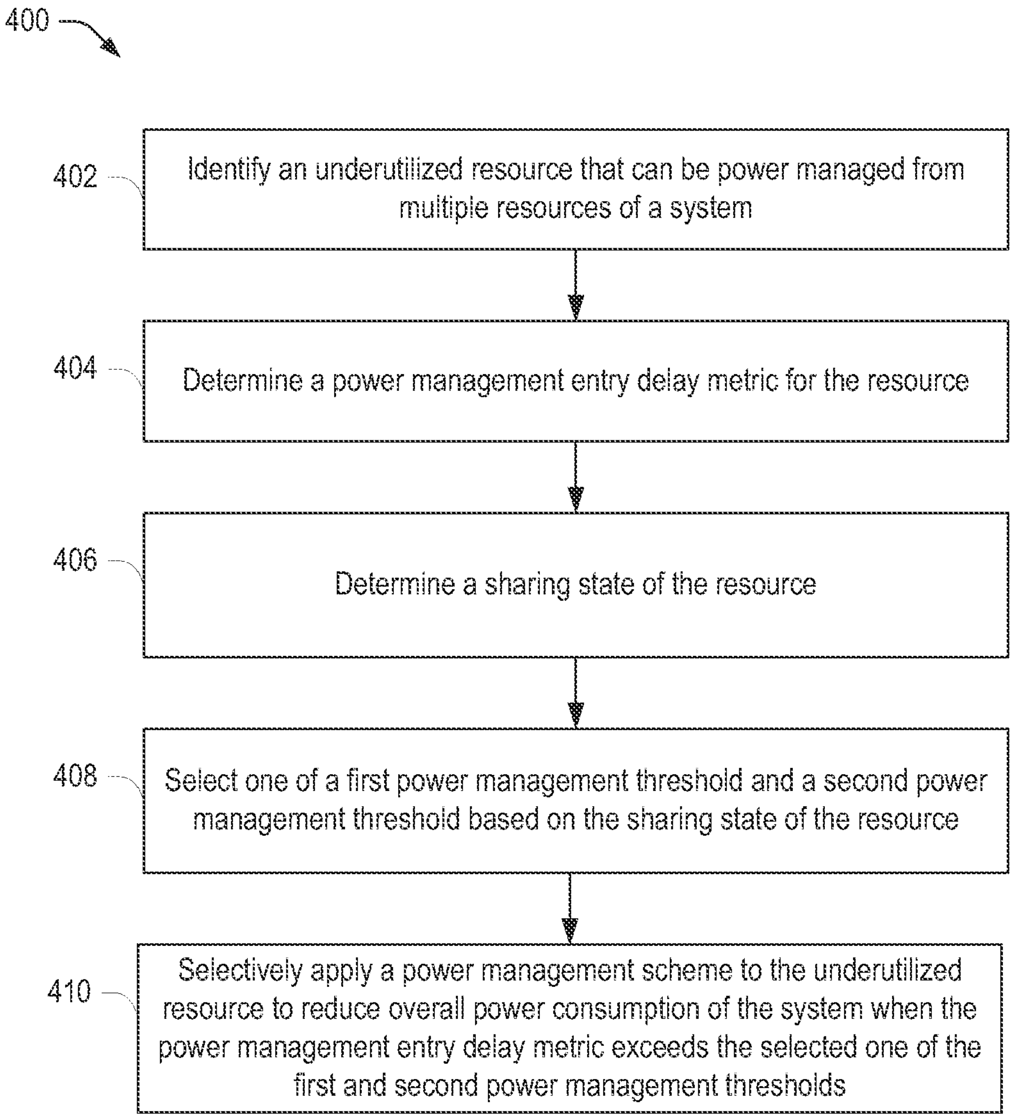
FIG. 4 is a flow diagram of an embodiment of a method of applying a selected power management scheme to a resource to reduce overall power consumption of the system.

FIG. 4 is a flow diagram of an embodiment of a method 400 of applying a selected power management scheme to a resource to reduce overall power consumption of the system. At 402, the controller identifies an underutilized resource from multiple resources of a system, where the underutilized resource can be power managed. In an example, the underutilized resource can be an inactive core of a multi-core processor. Advancing to 404, the controller determines a power management entry delay metric for the resource. In this example, one or more monitors (such as monitors 128 in FIG. 1) can determine the performance impact associated with power managing the particular resource.

Continuing to 406, the controller determines a sharing state of the resource (i.e., whether the resource is a shared resource or a non-shared resource). Proceeding to 408, the controller selects one of a first power management threshold and a second power management threshold based on the sharing state of the resource. In some instances, performance impact monitor 220 and controller 210 (in FIG. 2) can cooperate to adjust the shared resource threshold 222 and/or the exclusive resource threshold 224 based on performance data over time, thereby improving the performance/power consumption ratio over time. Moving to 410, the controller selectively applies a power management scheme to the underutilized resource to reduce overall power consumption of the system when the power management entry delay metric exceeds the selected one of the first and second power management thresholds. In an example, the controller compares the metric to the selected threshold to determine whether or not to allow the resource to enter a power managed state.

In conjunction with the systems and methods described above with respect to FIGS. 1-4, a power management scheme is described that applies a non-uniform transition threshold to manage entry of non-shared resources and shared resources into a power-managed state. For example, a controller of a processor can apply a lower threshold for a non-shared resource as compared to a shared resource for determining whether to permit entry into the power managed state. Further, in some instances, the controller can apply a higher threshold to a last resource of a particular tier of resources than for other resources at the same level. Thus, the controller can balance the performance impact due to delays caused by transitioning in and out of the power managed state against the power savings achieved by entry into the power managed state. By applying a higher threshold for the last core of multiple cores, entry of a shared resource into the power managed state is delayed, which helps to achieve a balance between performance and power consumption.

Although the present invention has been described with reference to preferred embodiments, workers skilled in the art will recognize that changes may be made in form and detail without departing from the scope of the invention.

What is claimed is:

1. A processor comprising:

a plurality of exclusive resources, each exclusive resource accessible to a certain core of a plurality of cores;

a shared resource that is accessible to more than one core of the plurality of cores; and a controller configured to manage power state transitions of each of the plurality of exclusive resources and the shared resource, the controller to receive a request from a resource to transition from a first power state to a lower power state and, in response to receiving the request, the controller to control power state transitions of the resource according to a first power control threshold when the resource is one of the plurality of exclusive resources and according to a second power control threshold that is greater than the first power control threshold when the resource is the shared resource.

2. The processor of claim 1, wherein the second power control threshold is greater than the first power control threshold.

3. The processor of claim 1, wherein:
the plurality of exclusive resources comprises a plurality of cores, each core including at least one memory; and
the shared resource comprises a shared memory.

4. The processor of claim 1, further comprising:
a register including information to identify the shared resource; and
the controller configured to search the register to determine whether the resource is the shared resource.

5. The processor of claim 1, wherein the controller estimates a power management performance impact associated with transitioning the resource from the first power state to the lower power state.

6. The processor of claim 5, wherein the controller allows the request when the power management performance impact is less than the first threshold.

7. A power controller comprising:
a register to store information identifying at least one shared resource that is shared by more than one core of a plurality of cores; and
a controller coupled to the register, the controller configured to receive a request to enter a power managed state from a resource, the controller to access the register to determine a sharing state of the resource in response to receiving the request and to control power state transitions of the resource that is accessible to a certain core of the plurality of cores, in response to determining the sharing state, using one of a first delay if the resource is a shared resource and a second delay if the resource is a non-shared resource.

8. The power controller of claim 7, wherein
the non-shared resource comprises a cache of the certain core; and
the controller applies the second delay to control timing of the power state transitions for the cache.

9. The power controller of claim 7, wherein the first delay is greater than the second delay.

10. The power controller of claim 7, wherein the power state transitions comprise c-state transitions.

11. The power controller of claim 7, further comprising:
a first threshold corresponding to the shared resource;
a second threshold corresponding to the non-shared resource; and
a counter configured to count clock cycles; and
wherein the controller transitions the shared resource when a count value of the counter exceeds the first threshold and then resets the counter; and
wherein the controller transitions the non-shared resource when the count value of the counter exceeds the second threshold and then resets the counter.

12. The power controller of claim 11, wherein the controller is configured to update at least on of the first threshold and the second threshold.

13. The power controller of claim 11, wherein the first threshold is less than the second threshold.

14. A method comprising:
receiving a power management request from a resource, wherein the resource is an execution core of a processor;
determining a number of resources in a power managed state;
comparing the number to a total number of resources;
selecting a first threshold when the total number is equal to the number of resources in the power managed state;
selecting a second threshold when the total number is greater than the number of resources in the power managed state; and
controlling power state transitions of the resource using the first threshold in response to selecting the first threshold and using the second threshold in response to selecting the second threshold.

15. The method of claim 14, wherein the controlling power state transitions of the resource comprises:
determining a power management performance impact associated with the resource entering a power managed state in response to receiving the request; and
controlling the resource, in response to determining the power management performance impact, to transition from a first power state to a second power state according to a selected one of a first delay and a second delay in response to determining the power management performance impact.

16. The method of claim 15, wherein determining the power management performance impact comprises tracking a performance metric to estimate the performance impact.

17. The method of claim 16, wherein tracking the performance metric comprises determining at least one of an idle duration and an interrupt arrival rate associated with the resource.

18. The method of claim 15, wherein determining the power management performance impact comprises determining whether the resource is a shared resource or an exclusive resource.

19. The method of claim 15, wherein the controlling the resource further comprises:
comparing the power management performance impact to a selected threshold;
denying entry of the resource into the power managed state when the selected threshold exceeds the power management performance impact; and
otherwise allowing entry of the resource into the power managed state.

20. The method of claim 15, further comprising:
monitoring a number of clock cycles; and
controlling the resource to transition from one power state to a lower power state when the number of clock cycles exceeds a selected one of a first threshold and a second threshold.

* * * * *

UNITED STATES PATENT AND TRADEMARK OFFICE

CERTIFICATE OF CORRECTION

PATENT NO. : 9,075,609 B2
APPLICATION NO. : 13/327380
DATED : July 7, 2015
INVENTOR(S) : William Lloyd Bircher et al.

It is certified that error appears in the above-identified patent and that said Letters Patent is hereby corrected as shown below:

In the Specification:

In column 1, lines 49-50, replace “particularly multi-core” with “particularly in multi-core”.

In column 1, line 61, replace “tower” with “lower”.

In column 3, line 31, replace “father” with “further”.

In column 5, line 19, replace “White” with “While”.

Signed and Sealed this
Eighth Day of December, 2015

Michelle K. Lee
*Director of the United States Patent and Trademark Office*